(12) United States Patent
Oka

(10) Patent No.: US 6,411,245 B2
(45) Date of Patent: Jun. 25, 2002

(54) SIGNAL PROCESSING CIRCUIT

(75) Inventor: Hirohiko Oka, Tachikawa (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/873,457

(22) Filed: Jun. 4, 2001

(30) Foreign Application Priority Data

Jun. 8, 2000 (JP) ........................................ 2000-172397

(51) Int. Cl.$^7$ ........................... H03M 1/66; H03M 1/12
(52) U.S. Cl. ........................... 341/155; 341/50; 341/61
(58) Field of Search ............................... 341/155, 144, 341/123, 61, 50, 126, 122

(56) References Cited

U.S. PATENT DOCUMENTS

| | | | | |
|---|---|---|---|---|
| 4,901,148 A | * | 2/1990 | Nakayama et al. | 348/448 |
| 5,241,312 A | * | 8/1993 | Long | 341/163 |
| 5,333,199 A | * | 7/1994 | Kuwasaki | 381/1 |
| 5,400,315 A | * | 3/1995 | Koishi et al. | 386/126 |
| 6,154,154 A | * | 11/2000 | Suzuki et al. | 341/61 |
| 6,288,320 B1 | * | 9/2001 | Murakami et al. | 84/622 |

FOREIGN PATENT DOCUMENTS

| | | |
|---|---|---|
| GB | 293 288 | 3/1996 |
| GB | 2 319 938 | 6/1998 |
| JP | 11-86439 A | 3/1999 |

* cited by examiner

*Primary Examiner*—Peguy Jeanpierre
*Assistant Examiner*—Jean Bruner JeanGlaude
(74) *Attorney, Agent, or Firm*—Anderson Kill & Olick; Eugene Lieberstein; Michael N. Meller

(57) ABSTRACT

A signal processing circuit for converting a 2-channel analog signal into a digital signal includes an analog/digital conversion component for sequentially converting the 2-channel analog signal into digital data according to a sampling clock, and an operation control component for setting a high sampling frequency of the sampling clock at a frequency higher than a normal sampling frequency of the sampling clock and setting a sampling clock duty ratio so that digital data of at least one channel can be sampled.

3 Claims, 6 Drawing Sheets

SIGNAL PROCESSING CIRCUIT

BACKGROUND OF THE INVENTION

1. Field of the Invention

The present invention relates generally to a signal processing circuit, and more particularly, to an improved signal processing circuit that processes signals by sampling data from a plurality of channels at different selected sampling frequencies.

2. Description of the Related Art

Digitization of audio recording/reproduction apparatuses capable of editing audio data has proceeded briskly in recent years. In the digital audio field, digital data is typically processed in 16-bit chunks, as typified by the compact disk, or CD.

FIG. 1 is a block diagram of a conventional digital signal recording/reproduction apparatus.

As shown in FIG. 1, the conventional digital recording and/or reproduction apparatus (hereinafter recording/reproduction apparatus) 1 comprises a signal processing component 2, a read/write component 3 and an operation control component 4. The signal processing component 2 in turn comprises an analog/digital (A/D) converter 11, a digital audio circuit component 12, a digital/analog (D/A) converter 13 and a PLL circuit component 14.

A two-channel (left channel and right channel) analog signal is supplied from an input terminal to the A/D converter 11, together with a channel switching clock LRCK and a serial data clock SCLK from the PLL circuit component 14.

The A/D converter 11 selects the converted digital data from one or the other of the L channel or the R channel depending on the LR switching clock LRCK. The digital data converted by the A/D converter 11 is then supplied to the digital audio circuit component 12. The digital audio circuit component 12 processes the digital data supplied from the A/D converter 11 and supplies the processed data to the read/write component 3.

The read/write component 3, for example, comprises a hard disk drive, and records the digital data from the digital audio circuit component 12. The digital data written to the read/write component 3 is then read out, that is, reproduced, in response to a read command from the operation control component 4.

The digital data reproduced from the read/write component 3 is supplied to the digital audio circuit component 12. The digital audio circuit component 12 then processes the digital data from the read/write component 3 and supplies the processed data to the D/A converter 13.

The D/A converter 13 is supplied with the serial data clock SCLK and channel switching clock LRCK from the PLL circuit component 14. The D/A converter 13 acquires the digital data in a timing sequence set by the serial data clock SCLK and converts the acquired data into analog signals. The D/A converter 13 selects either L channel or R channel digital data based on the channel switching clock LRCK, and converts the selected data into an analog signal. The L channel or R channel analog signal output from the D/A converter 13 is then output from the L channel output terminal TLOUT or the R channel output terminal TROUT.

FIG. 2 is a diagram illustrating the operation of a conventional signal processing circuit, showing the timing of the channel switching clock LRCK, the serial data clock SCLK, and the digital data.

As shown in the diagram, the channel switching clock LRCK is set to a high level/low level duty ratio of 50:50.

The A/D converter 11 selects the digitized analog signal from the L channel input terminal TLIN when the channel switching clock LRCK is high and selects the digitized analog signal from the R channel input terminal TRIN when the channel switching clock LRCK is low.

The serial data clock SCLK contains 64 clock cycles, or bits, for each cycle of the channel switching clock LRCK. Since the channel switching clock LRCK is set to a duty ratio of 50:50, the high level interval and the low level interval are each set to 32 bits of the serial data clock SCLK, respectively.

The digital data is output at a rate corresponding to 1 bit of data per 1 clock cycle or bit of the serial data clock SCLK. Moreover, although FIG. 2 illustrates a process of converting 24-bit digital data, the channel switching clock LRCK and serial data clock SCLK are capable of converting a maximum of 32-bit digital data.

However, recent efforts to further improve audio quality have lead to the development of high-frequency sampling. In order to effect such large-bit, high-frequency sampling, it is not enough simply to increase the number of digital data bits and increase the frequency of the serial data clock. In other words, a digital audio processing circuit capable of processing such large-bit, high-frequency digital data is also a further requirement. However, designing and installing such a circuit entails additional development time and development costs, which is disadvantageous.

SUMMARY OF THE INVENTION

Accordingly, it is an object of the present invention to provide an improved and useful optical signal processing circuit in which the above-described disadvantage is eliminated.

Another, further and more specific object of the present invention is to provide an improved and useful digital signal processing circuit capable of high-frequency sampling using a simple structure that minimizes incremental development costs.

The above-described objects of the present invention are achieved by a signal processing circuit for converting a 2-channel analog signal into a digital signal, the signal processing circuit comprising:

an analog/digital conversion component for sequentially converting the 2-channel analog signal into digital data according to a sampling clock; and an operation control component for setting a high sampling frequency of the sampling clock at a frequency higher than a normal sampling frequency of the sampling clock and setting a sampling clock duty ratio so that digital data of at least one of the two channels can be sampled.

Additionally, the above-described objects of the present invention are also achieved by a signal processing circuit for converting 2-channel digital data into analog signals, the signal processing circuit comprising:

a digital/analog conversion component for sequentially converting the 2-channel digital data into analog signals according to a sampling clock; and an operation control component for setting a high sampling frequency of the sampling clock at a frequency higher than a normal sampling frequency of the sampling clock and setting a sampling clock duty ratio so that digital data of at least one of the two channels can be sampled.

According to these aspects of the invention, high-frequency sampling of the A/D or D/A converted data is attained.

BRIEF DESCRIPTION OF THE DRAWINGS

These and other objects, features, aspects and advantages of the present invention will become better understood and more apparent from the following description, appended claims and accompanying drawings, in which:

DETAILED DESCRIPTION OF THE INVENTION

A detailed description will now be given of an improved optical disk recording apparatus according to the present invention, with reference to the accompanying drawings. It should be noted that identical or corresponding elements are given identical or corresponding reference numbers in all drawings, with detailed descriptions thereof given once and thereafter omitted.

Figure 3:
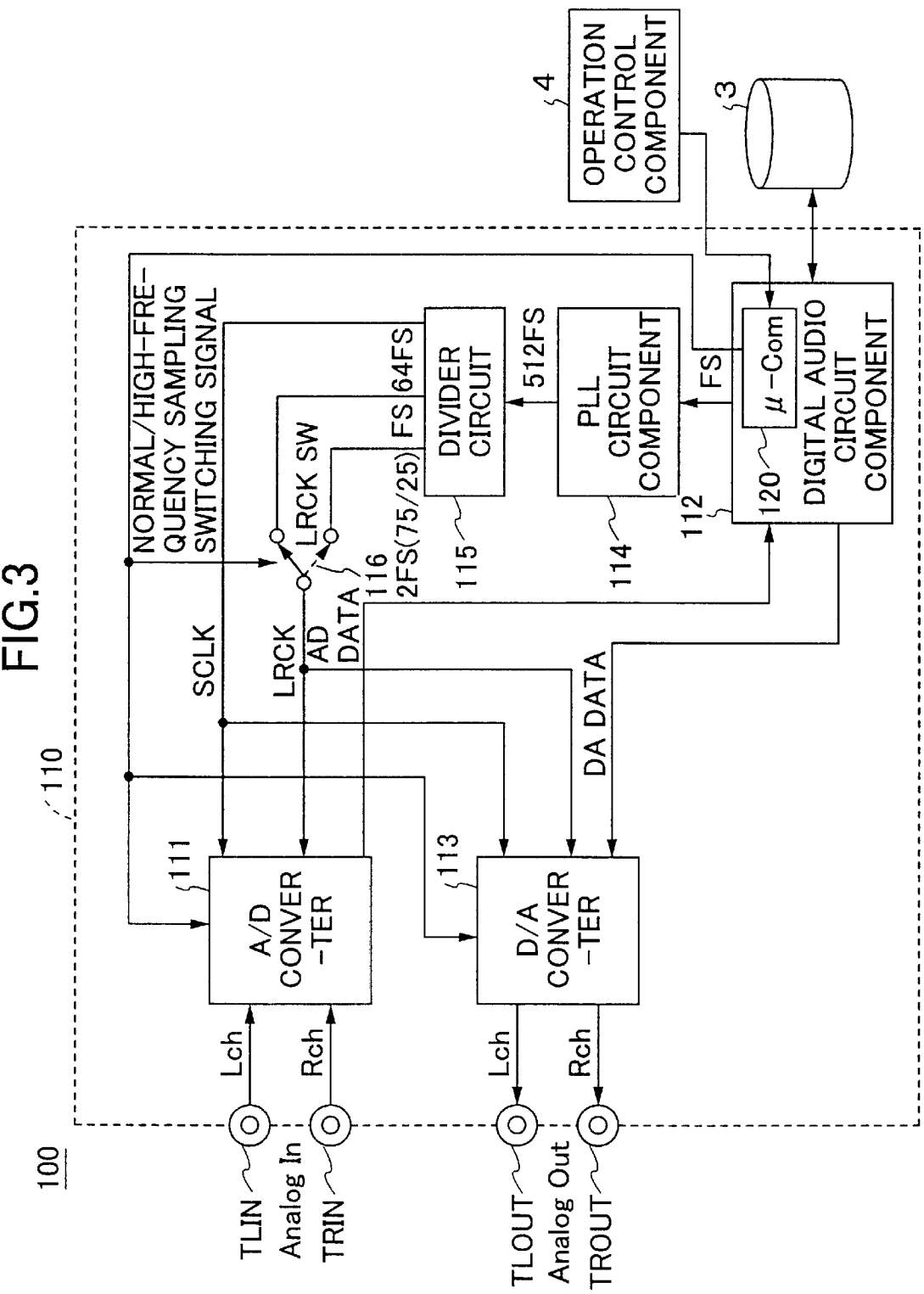
FIG. 3 is a block diagram of a signal processing circuit according to one embodiment of the present invention.

FIG. 3 is a block diagram of a signal processing circuit according to one embodiment of the present invention. Components that are identical to those shown in FIG. 1 are given identical reference numbers, with detailed descriptions thereof omitted.

Figure 1:
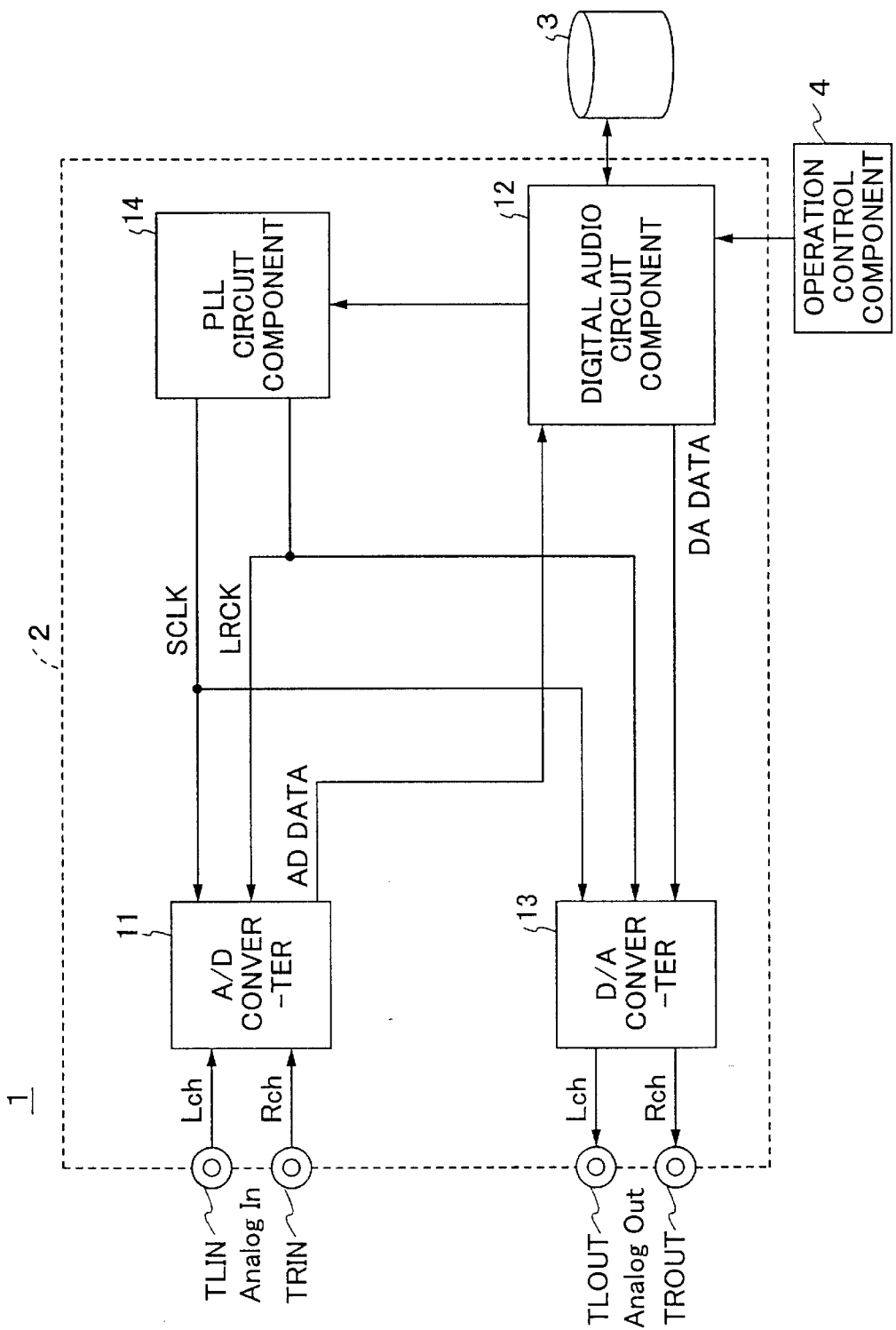
FIG. 1 is a block diagram of a conventional digital signal recording/reproduction apparatus.
Figure 2:
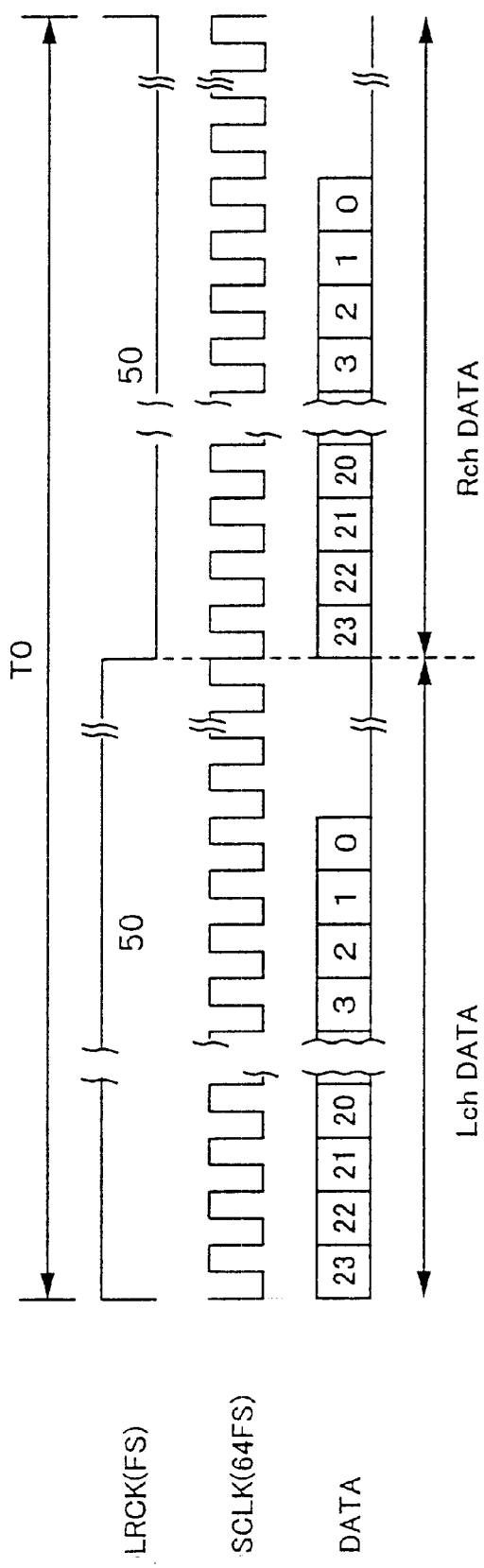
FIG. 2 is a diagram illustrating the operation of a conventional signal processing circuit, showing the timing of the channel switching clock LDCLK, the serial data clock SCLK, and the digital data.

The digital signal recording/reproduction apparatus 100 shown in FIG. 3 has a signal processing component 110 that differs from the signal processing component 2 of the digital signal recording/reproduction apparatus 1 shown in FIG. 1. The signal processing component 110 has an A/D converter 111, a digital audio circuit component 112, a D/A converter 113, a PLL circuit component 114, a divider circuit 115, and a LRCK switch 116.

The A/D converter 111 has the same composition as the A/D converter 11 shown in FIG. 1. The digital data converted at the A/D converter 111 is supplied to the digital audio circuit component 112.

The digital audio circuit component 112 has a microcomputer 120 that processes data and controls an operation of the read/write component 3 according to instructions from the operation control component 4.

The digital audio circuit component 112 processes the digital data from the A/D converter 111 and writes the processed data to the read/write component 3. Additionally, the digital audio circuit component 112 demodulates the digital data reproduced from the read/write component 3 into the original signal and supplies the demodulated data to the D/A converter 113.

The D/A converter 113 has the same composition as the D/A converter 13 shown in FIG. 1, and is designed to mute the R channel output terminal TROUT in response to an operation switching signal from the digital audio circuit component 112.

The PLL circuit component 114, which is composed of an ordinary PLL circuit, synchronizes to a serial data clock FS from the digital audio circuit component 112 and generates a clock 512 FS that is 512 times the serial data clock. The clock 512 FS generated by the PLL circuit component 114 is then supplied to the divider circuit 115.

The divider circuit 115 divides the clock 512 FS from the PLL circuit component 114 and generates a first channel switching clock FS, a second channel switching clock 2FS and a serial data clock 64FS. The first channel switching clock FS is the channel switching clock used during normal sampling, with the high level/low level duty ratio set at 50:50. The second channel switching clock 2FS is the channel switching clock used during high-frequency sampling and has a frequency approximately twice that of the first channel switching clock FS, with the high level/low level duty ratio set at approximately 75:25. The serial data clock 64FS has a frequency 64 times that of the first channel switching clock FS, and sets the timing of the transmission of each bit.

The serial data clock 64FS generated by the divider circuit 115 is supplied to the A/D converter 111 as well as the D/A converter 113. Each bit of digital data is transmitted from the A/D converter 111 and the D/A converter 113 at the serial data clock 64FS rate. The first channel switching clock FS and the second channel switching clock 2FS generated by the divider circuit 115 are supplied to the LRCK switch 116.

The LRCK switch 116 selectively outputs one of either the first or second channel switching clock FS, 2FS as channel switching clock LRCK in response to an operation switching signal from the digital audio circuit component 112. The LRCK switch 116 selects the first channel switching clock FS when for example the operation switching signal from the audio circuit component 112 is at the high level, and selects the second channel switching clock 2FS when the operation switching signal is at the low level.

The first channel switching clock FS or the second channel switching clock 2FS selected by the LRCK switch 116 is then supplied to the A/D converter 111 and the D/A converter 113.

A description will now be given of the operation of the microcomputer 120.

Figure 4:
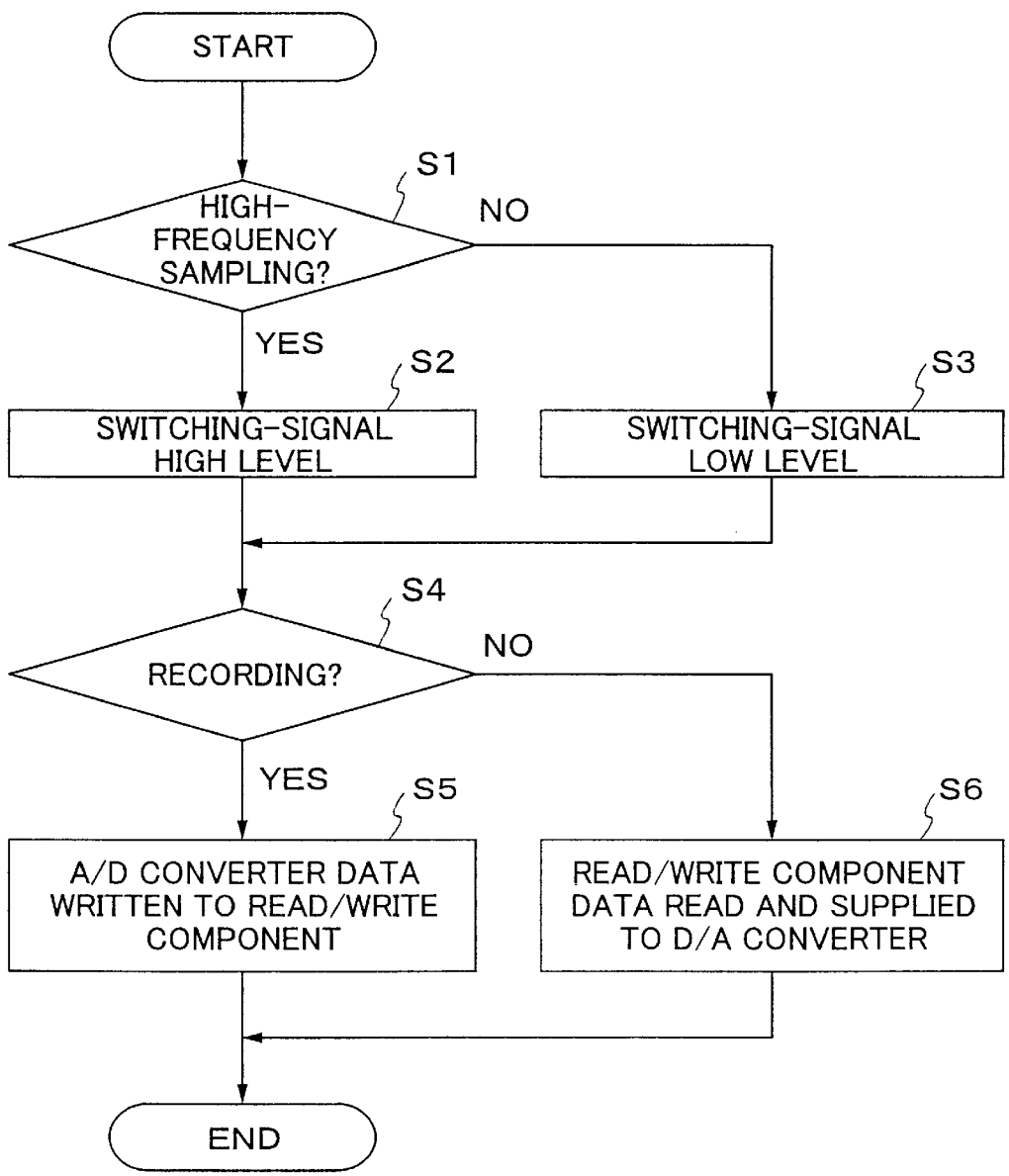
FIG. 4 is a flow chart of steps performed by a signal processing circuit microcomputer in a process of processing a signal according to one embodiment of the present invention.

FIG. 4 is a flow chart of steps performed by a signal processing circuit microcomputer in a process of processing a signal according to one embodiment of the present invention.

The microcomputer 120 generates operation switching signals in response to manipulation of the operation control part 4, and also controls the read/write operations of the read/write component 3.

If in a step S1 a high-frequency sampling operation is selected using the operation control component 4, then the microcomputer 120 sets the operation switching signal to high level in a step S2.

If on the other hand in the step S1 a normal operation is selected using the operation control component 4, then the microcomputer 120 sets the operation switching signal to low level in a step S3.

In a step S4, the microcomputer determines whether the command issued from the operation control component 4 is a recording (that is, a write) operation or a reproduction (that is, a read) operation.

If in step S4 the instruction from the operation control component 4 is a recording operation, then in a step S5 the microcomputer 120 writes the digital data from the A/D converter 111 to the read/write component 3.

If on the other hand in step S4 the instruction from the operation control component 4 is a reproduction operation, then in a step S6 the microcomputer 120 supplies the digital data reproduced from the read/write component 3 to the D/A converter 113.

A description will now be given of the high-frequency sampling operation referred to above.

Figure 5:
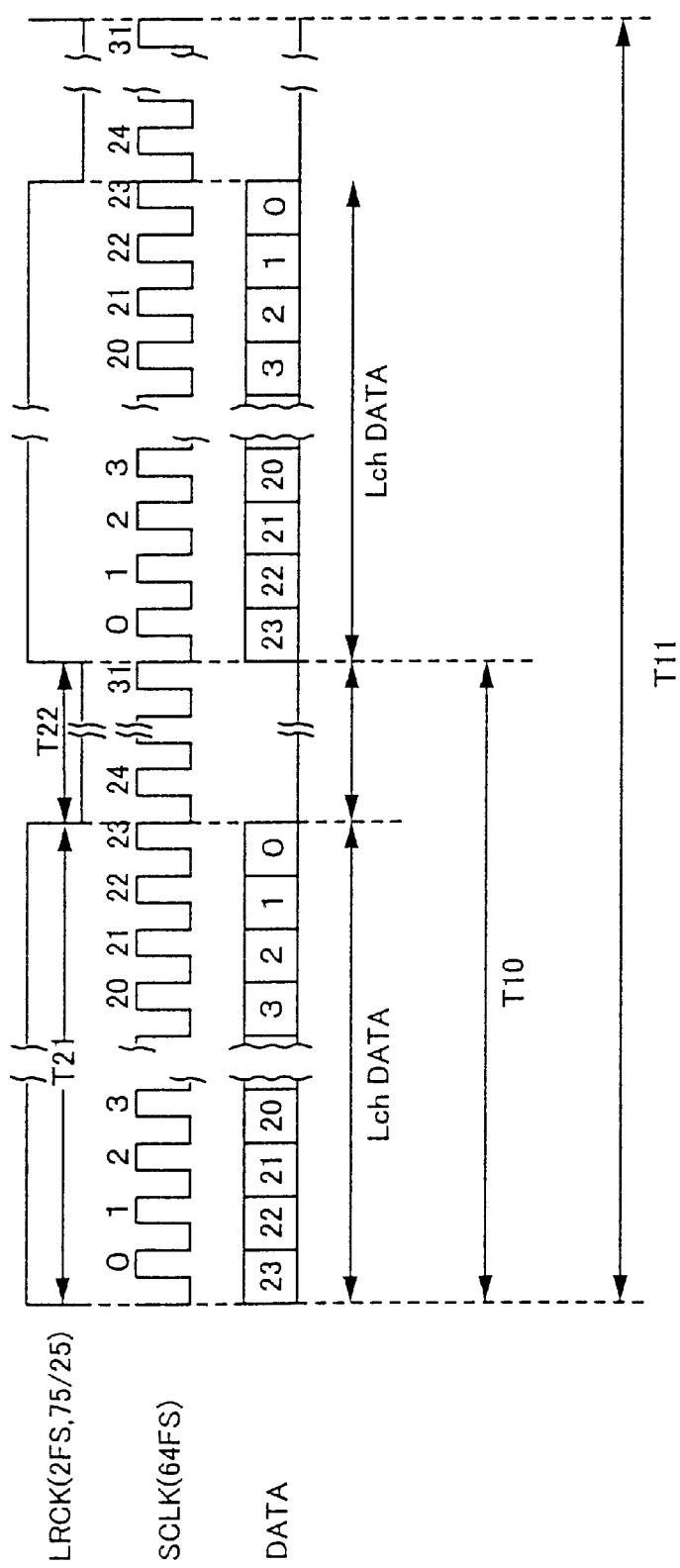
FIG. 5 is a first diagram illustrating the operation of a signal processing circuit according to one embodiment of the present invention, showing the LRCK, SCLK and data timing.
Figure 6:
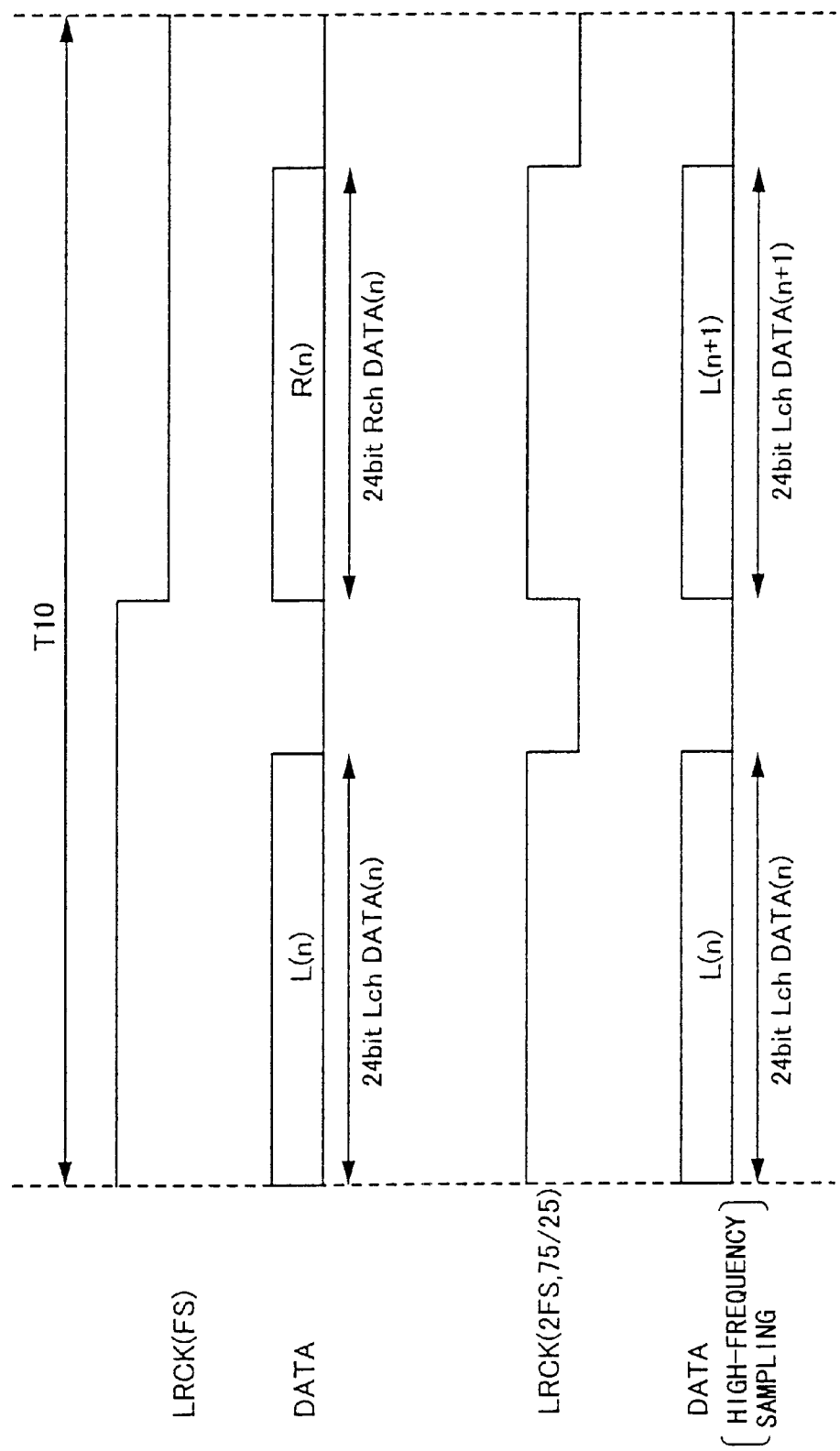
FIG. 6 is a second diagram illustrating the operation of a signal processing circuit according to one embodiment of the present invention, showing the first channel switching clock LRCK, the first channel switching clock selected channel, the second channel switching clock 2FS and the second channel switching clock 2FS selected channel timing.

FIG. 5 is a first diagram illustrating the operation of a signal processing circuit according to one embodiment of the present invention, showing the LRCK, SCLK and data timing. FIG. 6 is a second diagram illustrating the operation of a signal processing circuit according to one embodiment of the present invention, showing the first channel switching clock LRCK, the first channel switching clock selected channel, the second channel switching clock 2FS and the second channel switching clock 2FS selected channel timing.

The second channel switching clock 2FS cycle T10 is set to half the first channel switching clock FS cycle T11, and represents a cycle of serial data block 64FS and 32 clock cycles.

For example, at a time T21 shown in FIG. 5 and FIG. 6 as a high level interval of the second channel switching clock 2FS, of the signals input to the A/D converter 111, the L channel analog signal is converted into 24-bit digital data that is then transmitted at the rate of 1 bit per serial data clock SCLK trailing portion as shown in FIG. 5. Data transmission is as shown in FIG. 5 and FIG. 6.

At for example a time T22 shown in FIG. 5 and FIG. 6 as a low interval of the second channel switching clock 2FS, only 8 clock cycles exist, so even with the A/D converter 111 converting the R channel analog signal into 24-bit digital data, such data cannot be output as useful data. The R channel data from the A/D converter 111 during this time interval T22 is processed by a digital signal processing component (not shown in the diagram) of the digital audio circuit component 112 as "Don't Care", and is ignored as data.

It should be noted that during a normal operating mode the first channel switching clock FS having a duty ratio of 50:50 as shown in FIG. 6 is supplied. When the first channel switching clock FS is at high level, the L channel data is output. When the first channel switching clock FS is at low level, the R channel data is output.

According to the present embodiment as described above, it is possible to select between a normal sampling operation and a high-frequency sampling operation simply by using a high-frequency sampling-capable A/D-D/A converter configuration and switching the channel switching clock LRCK frequency and duty ratio. Accordingly, the present invention makes it possible to conduct high-frequency sampling using a relatively simple structural configuration, thus making it possible to obtain high-quality audio.

Moreover, the signal processing circuit of the present invention employs a conventional 24-bit signal processing circuit made capable of accommodating high-frequency sampling simply by changing the channel switching signal frequency and duty ratio. Accordingly, no independent development costs are incurred and high-frequency sampling circuit can be produced relatively easily as a result.

Also, the system clock frequency remains unchanged, which is advantageous in terms of the amount of heat generated and radiated and the amount of power consumed by the unit as a whole.

As can be appreciated by those of skill in the art, although the signal processing circuit according to the present invention can only sample one channel at a time, as shown in FIG. 6, the L-channel data is high-frequency sampled after the R-channel data is processed using normal sampling, so the amount of data sampled per unit time interval during high-frequency sampling is unchanged from the amount of data sampled during normal sampling, thus maximizing data processing performance.

As described above, when transmitting 24-bit digital data, setting the serial data clock FS to 48 kHz causes the channel switching clock LRCK 2FS to go to 96 kHz, and by setting the duty ratio to 75:25 the sampling frequency can be doubled.

Additionally, in the case of 20-bit data, by setting the duty ratio to 62.5:37.5 similarly doubles the sampling frequency. However, a duty ratio of 62.5:37.5 is not practical, so by maintaining the duty ratio at 75:25 a 4-bit blank interval is treated as "Don't Care " and ignored.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 2000-172397, filed on Jun. 8, 2000, the entire contents of which are hereby incorporated by reference.

What is claimed is:

1. A signal processing circuit for converting a 2-channel analog signal into a digital signal, the signal processing circuit comprising:

an analog/digital conversion component for sequentially converting the 2-channel analog signal into digital data according to a sampling clock; and an operating control component for setting a high sampling frequency of the sampling clock at a frequency higher than a normal sampling frequency of the sampling clock and setting a sampling clock duty ratio so that digital data of at least one of the two channels is set to a sample-enabled duty ratio.

2. A signal processing circuit for converting 2-channel digital data into analog signals, the signal processing circuit comprising:

a digital/analog conversion component for sequentially converting the 2-channel digital data into analog signals according to a sampling clock; and an operating control component for setting a high sampling frequency of the sampling clock at a frequency higher than a normal sampling frequency of the sampling clock and setting a sampling clock duty ratio so that digital data of at least one of the two channels is set to a sample-enabled duty ratio.

3. The signal processing circuit as claimed in claim 2, wherein the operation control component halts output of the analog signal of the other of the two channels during high sampling.

* * * * *